(12) United States Patent
Trotzko

(10) Patent No.: US 9,976,662 B2
(45) Date of Patent: May 22, 2018

(54) VALVE WITH DAMPER

(71) Applicant: HS Wroclaw Sp. z o. o., Wroclaw (PL)

(72) Inventor: Stefan Trotzko, Wroclaw (PL)

(73) Assignee: HS WROCLAW SP. Z O.O, Wroclaw (PL)

(*) Notice: Subject to any disclaimer, the term of this patent is extended or adjusted under 35 U.S.C. 154(b) by 43 days.

(21) Appl. No.: 15/074,198

(22) Filed: Mar. 18, 2016

(65) Prior Publication Data

US 2016/0273668 A1 Sep. 22, 2016

(30) Foreign Application Priority Data

Mar. 21, 2015 (EP) ..................................... 15461519

(51) Int. Cl.
*F16K 17/04* (2006.01)
*F16K 17/06* (2006.01)
*F16K 15/02* (2006.01)

(52) U.S. Cl.
CPC ........ *F16K 17/0433* (2013.01); *F16K 15/026* (2013.01); *F16K 17/06* (2013.01)

(58) Field of Classification Search
CPC ..... F16K 17/0433; F16K 17/06; F16K 17/026
USPC .............. 137/535, 540, 543.17, 514.5, 514.7
See application file for complete search history.

(56) References Cited

U.S. PATENT DOCUMENTS

| | | | | |
|---|---|---|---|---|
| 533,953 A | * | 2/1895 | Holly .................. | F16K 17/0433 137/505 |
| 1,338,906 A | * | 5/1920 | Coulson ............... | F04B 53/126 137/540 |
| 2,703,217 A | * | 3/1955 | Ashton ................. | F16K 15/18 137/540 |
| 3,007,481 A | * | 11/1961 | Frost ...................... | F16K 29/00 137/115.14 |
| 3,027,913 A | * | 4/1962 | Chatham .............. | F16K 15/063 137/484.2 |
| 3,618,690 A | * | 11/1971 | Johnson ................ | F16K 17/042 137/514.7 |

FOREIGN PATENT DOCUMENTS

| | | |
|---|---|---|
| CH | 641260 A5 | 2/1984 |
| DE | 1772318 U | 8/1958 |
| DE | 19804752 A1 | 8/1999 |
| DE | 102011075620 A1 | 11/2012 |
| FR | 2192679 A5 | 2/1974 |
| GB | 1203485 A | 8/1970 |

OTHER PUBLICATIONS

European Search Report for application No. EP15461519.9; dated Sep. 2, 2015, 6 pages.

* cited by examiner

*Primary Examiner* — Craig Schneider
*Assistant Examiner* — P. Macade Nichols
(74) *Attorney, Agent, or Firm* — Cantor Colburn LLP

(57) ABSTRACT

A pressure relief valve includes a valve element having, at one end, a flow restricting head and, at an opposed end, a damping head. The damping head includes a damping channel formed therein to allow fluid flow between an inlet chamber and a damping chamber of the valve.

16 Claims, 1 Drawing Sheet

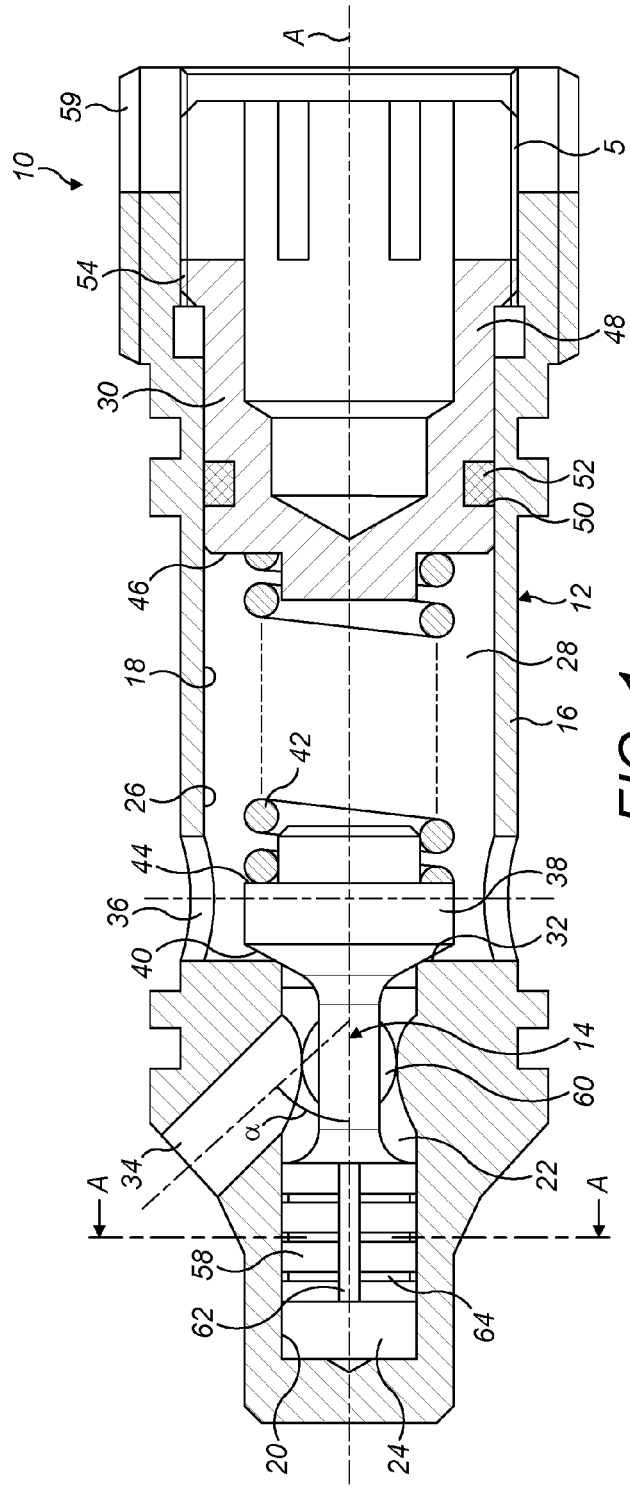
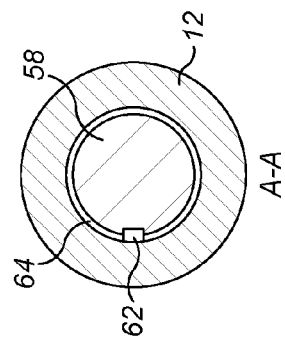
FIG. 1
FIG. 2

VALVE WITH DAMPER

FOREIGN PRIORITY

This application claims priority to European Patent Application No. 15461519.9 filed Mar. 21, 2015, the entire contents of which is incorporated herein by reference.

TECHNICAL FIELD

The present disclosure relates to valves, for example pressure relief valves.

BACKGROUND

Valves such as pressure relief valves, pressure regulation valves and check valves are often subject to pressure pulsations in the working fluid. Pressure pulsations cause undesirable vibration of valve parts and noise in the valve.

While various attempts have been made to neutralise pressure pulsations in valves, these systems are often complex, add undesirable mass to the valve and do not provide sufficient reduction in pressure pulsations.

It would be desirable to provide a valve that automatically damps pressure pulsations to reduce noise therein.

It would be further advantageous to provide a valve having a damper which did not significantly alter the hysteresis of the valve in order that it could be incorporated in existing fluid systems.

SUMMARY

There is disclosed herein a valve comprising a housing which defines an inlet chamber and an outlet chamber. A valve seat is provided between the inlet chamber and outlet chamber. The valve also includes a valve element comprising a flow restricting head for engaging the valve seat to restrict fluid flow from the inlet chamber to the outlet chamber. The valve element further comprises a damping head, the damping head and the housing defining a damping chamber. The damping head includes at least one damping channel for communicating fluid between the inlet chamber and the damping chamber. The valve further comprises a biasing means for biasing the flow restricting head against the valve seat when fluid in the inlet chamber is below a predetermined pressure.

The damping channel is configured to reduce pressure pulsations in the working fluid.

The damping channel may be formed on an outer surface of the damping head. It may, for example, be a channel, for example a rectangular channel, extending along the entire axial length of the damping head. Alternatively, it could be formed as a passage extending through the head.

The damping head may further comprise at least one circumferential groove formed on its outer surface and intersecting the damping channel. The groove may be configured to receive working fluid in order to lubricate the damping head. The groove may extend completely around the circumference of the damping head or only partly there around.

In an embodiment there are at least axially spaced 3 circumferential grooves.

The depth of the damping channel may be greater than the depth of the grooves, for example, the depth of the damping channel may be from 1.5 to 2 times the depth of the grooves.

The flow restricting head and damping head may be at opposite axial ends of the valve element.

In an embodiment, the biasing means is a spring, for example a coil spring, and the pressure relief valve further comprises a pressure setting element for adjusting the compression of the spring against the valve element.

The valve housing may be formed in one part, with a blind bore formed therein from an open end to form the respective chambers of the valve.

A plug, for example a one piece plug, may close the open end of the blind bore.

The plug may be adjustably mounted for adjusting the biasing pressure of the biasing means.

The valve may further comprise one or more fluid inlets for receiving working fluid into the inlet chamber, the inlet or inlets being formed at an acute angle relative to the axis of the valve.

The valve may be a pressure relief valve and may be incorporated into a hydraulic system such as a hydraulic damper, hydraulic pump or hydraulic motor.

BRIEF DESCRIPTION OF DRAWINGS

FIG. 1 shows a cutaway view of an exemplary pressure relief valve;

FIG. 2 shows a section view of the valve head in FIG. 1 through line A-A.

DETAILED DESCRIPTION

With reference to FIGS. 1 and 2, a pressure relief valve 10 is shown. Although illustrated in the context of a pressure relief valve, the valve construction disclosed herein is not limited to such a valve.

The valve 10 includes a housing 12 and a valve element 14.

The housing 12 in this embodiment is formed as a one piece body 16 having a blind bore 18 which defines, along the axis of the housing 12, a first bore section 20 defining an inlet chamber 22 and a damping chamber 24 and a second bore section 26 defining an outlet chamber 28. The second bore section 26 is closed by a plug 30, as will be described further below.

Although illustrated as being formed in a single piece, the valve body 16 may of course be made in multiple pieces suitably joined together. Also, the bore 18 may extend completely through the body 16 and have its other end suitably closed. A one piece body 16 may, however, have the advantage of ease of assembly and weight compared to a multipart construction.

As illustrated, the first bore section 20 has a smaller diameter than the second bore section 26, and a valve seat 32 is formed between the inlet chamber 22 and outlet chamber 28 at the shoulder between the first bore section 20 and the second bore section 26.

A plurality of fluid inlets 34 are formed through the wall of the housing 12 to communicate with the inlet chamber 22 and a plurality of fluid outlets 36 are formed through the wall of the housing 12 communicate with the outlet chamber 28. In this embodiment, four fluid inlets 34 and four fluid outlets 36 are provided, although the precise number of inlets 34 and outlets 36 may be chosen as appropriate for any particular application. Also, while in this embodiment, the inlets 34 and outlets 36 are equi-spaced circumferentially around the respective inlet and outlet chambers 22, 28, the position of the inlets 34 and outlets 36 may be chosen as appropriate for any particular application.

The fluid inlets 34 are shown as being inclined at an acute angle $\alpha$ to the axis A of the housing 12, but this is not essential and the inlets 34 may be arranged at any suitable angle, for example perpendicularly to the axis A.

The valve element 14 controls fluid flow between the inlet chamber 22 and the outlet chamber 28. The valve element 14 includes, at one axial end thereof, a flow restricting head 38 having a frustoconical surface 40 which engages the valve seat 32 to prevent fluid flow between the inlets 34 and outlets 36. While the restricting head 38 is shown with a frustoconical surface 40, other shapes of restricting head 38 may be appropriate depending on the particular valve seat arrangement and construction. Thus the flow restricting head 38 may be any shape that effectively cooperates with the valve seat 32 to prevent fluid flow between the inlet chamber 22 and outlet chamber 28.

A coil spring 42 is received in the second bore section 26. One end of the spring 42 is received on a spring seat 44 formed on the flow restricting head 38. The other end of the spring 42 is received on a spring seat 46 formed on the bore plug 30. The spring 42 acts to bias the frustoconical surface 40 of the flow restricting head 38 against the valve seat 32 to close the communication between the inlets 34 and outlets 36.

The plug 30 has a wall portion 48 which is closely received within the second bore portion 26 of the housing body 16. The wall portion includes a circumferential groove 50 which receives a seal such as an O-ring 52 for sealing the open end of the outlet chamber 28.

The plug further has a threaded section 54 which is received in a corresponding internally threaded portion 56 of the housing body 16 to allow adjustment of the axial position of the plug 30 within the housing 12, thereby adjusting the compression of the spring 42 against the valve head 38 thereby setting the pressure at which the valve will open. The housing 12 has a further, externally threaded area 59 for mounting the housing 12 in an assembly.

The valve element 14 further includes a cylindrical damping head 58 which is arranged at the opposite axial end of the element 14 from the flow restricting head 38. The damping head 58 is separated from the flow restricting head by a reduced diameter shaft portion 60.

The damping head 58 is received in the first bore section 20 so as to define in the first bore section 20 the damping chamber 24, on one side of the damping head and the inlet chamber 22 on the other side thereof.

The damping head 58 includes a damping channel 62 formed on its outer peripheral surface. The damping channel 62 extends in an axial direction along an entire length of the damping head 58 from one axial side of the damping head 58 to the other. The channel 62 provides a flow path for fluid from the inlet chamber 22 to the damping chamber 24. Although shown as extending in a direction parallel to the axis A of the valve element 14, the damping channel 62 may extend at an angle relative thereto in other embodiments.

The damping head 58 further includes three axially spaced grooves 64 extending completely around the circumference of the damping head 58. The grooves 64 intersect the damping channel 62. The diameter of the damping head is reduced at the grooves 64. Although three grooves 64 are illustrated, a different number for example one or two or four or more grooves 64 may be provided as appropriate. Also, the grooves 64 need not extend completely around the circumference of the damping head 58 in other embodiments.

As shown in FIG. 2, the grooves 64 extend around the entire circumference of the damping head 58 to a constant radial depth. The damping channel 62 is formed on the outer surface of the damping head 58 as a rectangular keyway. The channel 62 may be milled into the damping head in embodiments.

The damping channel 62 has a constant radial depth along the entire length of the damping head 58. In the illustrated embodiment, the depth of the damping channel 62 is greater than the depth of the grooves 64, more particularly between 1.5 and 2 times deeper than the grooves 64.

Operation of the valve 10 will now be described.

Fluid is supplied to the valve 10 from a source not shown. The fluid enters the valve 10 via the inlets 34 and is received into the inlet chamber 22. When the valve 10 is in a closed condition, the frustoconical surface 40 of the flow restricting head 38 is engaged with the valve seat 32 to prevent fluid flow from the inlet chamber 22 to the outlet chamber 28. When fluid in the inlet chamber 22 reaches a certain pressure (known as the valve cracking pressure), the force of the fluid acting on the flow restricting head 38 overcomes the biasing force of the spring 42 and the flow restricting head 38 moves away from the valve seat 32 to allow fluid to flow from the inlet chamber 22 into the outlet chamber 28, thereby relieving the pressure in the pressure source.

Pulsations in the pressure of the fluid in the inlet chamber 22 caused by an external source (not shown) will cause movement of the valve element 12 and thus cause fluid to travel between the inlet chamber 22 and the damping chamber 24 via the damping channel 62. The fluid is also communicated into the grooves 64, which act to lubricate the movement of the damping head 58 within the first bore section 20, from the damping channel 62. The shape and dimensions of the damping channel 62 may be chosen to provide a suitable damping effect in any particular installation.

It will be appreciated that the above is a description of just one embodiment and that various modifications may be made thereto. For example, the damping head 58 may include any number of grooves 64 and the damping channel 62 may be in any form that allows the working fluid to flow from the inlet chamber 22 to the damping chamber 24.

The invention claimed is:

1. A valve comprising:
   a housing defining an inlet chamber, and an outlet chamber
   a valve seat positioned between the inlet chamber and outlet chamber;
   a valve element comprising
      a flow restricting head for engaging the valve seat to restrict fluid flow from the inlet chamber to the outlet chamber; and
      a damping head, the damping head and the housing defining a damping chamber, the damping head including
         at least one damping channel for communicating fluid between the inlet chamber and the damping chamber; and
   a biasing means for biasing the flow restricting head against the valve seat when fluid in the inlet chamber is below a predetermined pressure;
   wherein the damping head further comprises at least one circumferential groove intersecting the damping channel;
   wherein the damping head comprises at least 3 circumferential grooves; and
   wherein a depth of the damping channel is greater than a depth of the grooves.

2. The valve of claim 1, wherein the damping channel is formed on an outer surface of the damping head.

3. The valve or valve element of claim 1, wherein the depth of the damping channel is from 1.5 to 2 times the depth of the grooves.

4. The valve of claim 1, wherein the flow restricting head and damping head are at opposing axial ends of the valve element.

5. The valve of claim 1, wherein the biasing means comprises a coil spring, and wherein the valve further comprises an adjustable element for adjusting the compression of the spring against the valve element.

6. The valve of claim 1, wherein the housing is formed in one part, with a blind bore formed therein from an open end to form the respective chambers of the valve.

7. The valve of claim 6, further comprising a plug closing the open end of the blind bore.

8. The valve of claim 7, wherein the plug is a one piece plug.

9. The valve of claim 7, wherein the plug is adjustable element to adjust the biasing pressure of the biasing means.

10. The valve of claim 1, further comprising one or nor more fluid inlets for receiving working fluid into the inlet chamber, the inlet or inlets being formed at an acute angle relative to the axis of the valve.

11. The valve of claim 1, wherein the valve is a pressure relief valve.

12. A valve element for a valve comprising:
a flow restricting head at a first axial end of the valve element; and
a damping head at an opposing axial end of the valve element, the damping head including a channel extending along an entire axial length of the damping head, the damping head further comprises at least three circumferential groove intersecting the damping channel.

13. The valve element of claim 12, wherein the damping channel is formed on an outer surface of the damping head.

14. The valve element of claim 12, wherein a depth of the damping channel is greater than the depth of the circumferential grooves, for example wherein the depth of the damping channel is from 1.5 to 2 times the depth of the grooves.

15. The valve element of claim 12, wherein the flow restricting head and damping head are at opposing axial ends of the valve element.

16. The valve element of claim 12, wherein the valve is a pressure relief valve.

* * * * *